United States Patent
Longoria

[15] 3,692,092
[45] Sept. 19, 1972

[54] PAPER CONTAINING A POLYETHYLENIMINE-FATTY ACID EPICHLOROHYDRIN PRODUCT

[72] Inventor: Juan Longoria, Lake Jackson, Tex.

[73] Assignee: The Dow Chemical Company, Midland, Mich.

[22] Filed: April 1, 1971

[21] Appl. No.: 130,464

Related U.S. Application Data

[62] Division of Ser. No. 736,556, June 13, 1968, Pat. No. 3,622,528.

[52] U.S. Cl. .................................................162/164
[51] Int. Cl. ..............................................D21h 3/58
[58] Field of Search .260/2 EN, 18 N, 18 R, 29.2 EP; 162/164, 168

[56] References Cited

UNITED STATES PATENTS

| | | | |
|---|---|---|---|
| 2,601,597 | 1/1952 | Daniel | 162/164 |
| 2,882,185 | 4/1959 | Valko et al. | 260/18 N |
| 2,926,116 | 2/1960 | Keim | 260/29.2 EP |
| 2,969,302 | 1/1961 | Green | 162/164 |
| 3,313,736 | 4/1967 | Dickson et al. | 260/2 EN |

FOREIGN PATENTS OR APPLICATIONS

6,612,293 3/1967 Netherlands............260/2 EN

Primary Examiner—S. Leon Bashore
Assistant Examiner—Frederick Frei
Attorney—D. B. Kellom et al.

[57] ABSTRACT

An improved polyethylenimine adduct for cellulosic products is prepared by condensing polyethylenimine with 0.05–0.4 mole of a $C_{12}$–$C_{22}$ fatty acid and thereafter capping the residual free amino groups by reaction in aqueous solution at 0°–50°C. with epichlorohydrin. The resulting product is an effective softener, sizing agent, and wet strength additive for paper and other cellulosic products with superior color stability and increased resistance to yellowing.

8 Claims, No Drawings

PAPER CONTAINING A POLYETHYLENIMINE-FATTY ACID EPICHLOROHYDRIN PRODUCT

This is a Division of application Ser. No. 736,556 filed June 13, 1968.

BACKGROUND

Numerous polyamine condensation products with a wide variety of acylating and alkylating agents including fatty acids and epichlorohydrin have been described and recommended as additives for paper, textiles, and other cellulosic products. For example, Dudley U.S. Pat. No. 2,479,480 describes fatty acid condensates of water-soluble thermosetting alkylenepolyamine resins while Reynolds U.S. Pat. No. 2,772,969 recommends colloidal dispersions of such condensates as sizing agents for paper. Dickson e.a. U.S. Pat. 3,301,783 describes the use of acylated polyethylenimines as corrosion inhibitors in lubricants. German Pat. No. 717,155 describes a condensation product of polyethylenimine and stearoyl chloride useful as a softening agent and surfactant in treating textiles.

A major weakness of these and other polyamine products is the oxidative discoloration which occurs on exposure to air, particularly in the presence of light.

Currently the only major commercial products are the polyamidopolyamine-epichlorohydrin polymers described by Keim U.S. Pat. Nos. 2,926,116 and 2,926,154. These resins, prepared by condensation of a saturated aliphatic dibasic acid with an alkylenepolyamine such as diethylenetriamine and thereafter by reaction of the polyamidopolyamine with from 0.5–2.0 moles epichlorohydrin/secondary amino group, are effective and widely used wet-strength additives for paper.

SUMMARY OF THE INVENTION

A process has been discovered for preparing new and improved water-soluble substantive polyethylenimine derivatives useful as an additive for cellulosic products and having superior color stability when incorporated in such products. More specifically the process comprises: (A) condensing polyethylenimine with about 0.05–0.4 mole of a $C_{12}$–$C_{22}$ fatty acid to yield a water-soluble aminopolyamide; and thereafter (B) capping the residual amino groups by reaction in aqueous solution at about 0°–50° C. with at least 0.8 mole and preferably about 0.85–1.2 mole of epichlorohydrin per amino group.

The resulting polyethylenimine-fatty acid-epichlorohydrin condensation product is a water-soluble thermosetting resin with a blend of physical and chemical properties highly desirable for paper or textile applications. It is stable as a 15–30 weight percent aqueous solution at about pH 2.0–7.5, but cures readily when the solution or treated product is dried or made strongly alkaline. It is an effective sizing agent when applied to paper at a loading of at least about 0.1 weight percent, preferably about 0.5–5.0 weight percent. It can be used with alkaline paper pulps as well as acidic or neutral pulps. In addition to imparting a high degree of water resistance, it also significantly improves the wet strength of paper and textiles. Also when applied in a lower concentration of about 0.05–0.50 wt. per cent it imparts significant softness to the treated products. Furthermore the treated product and its aqueous solutions have enhanced resistance to yellowing on aging coupled with good stability and shelf life.

REACTANTS

Polyethylenimine (PEI) is a commercially available water-soluble cationic polymer formed by polymerization of ethylenimine as described, for example, by Ulrich U.S. Pat. No. 2,182,306 and Wilson U.S. Pat. No. 3,203,910. It is a highly branched polymer with a ratio of primary/secondary/tertiary nitrogens of approximately 1/1.5–2.0/1.

Particularly desirable for use herein are the polymers prepared by an acid-catalyzed, anhydrous polymerization of ethylenimine having an average molecular weight of about 500–5,000 based on ebulliometric methods. However, higher molecular weight polyethylenimines, including products made in aqueous solution and having an average molecular weight of 100,000 or more, can also be used.

To impart the desired water resistance and softer hand, a $C_{12}$–$C_{22}$ fatty acid is used. Particularly suitable are saturated $C_{12}$–$C_{18}$ fatty acids such as lauric, palmitic and stearic acids which are readily available and have good chemical stability. Also suitable are the fatty acid mixtures available from the hydrogenation of tall oil, cottonseed oil or coconut oil. For some applications unsaturated $C_{12}$–$C_{22}$ fatty acids such as oleic acid, linoleic acid, and tall oil can be used.

To cap the residual amino groups of the PEI-fatty acid condensate, epichlorohydrin is the preferred reagent although epibromohydrin can also be used. Under appropriate conditions the epihalohydrin can be formed in situ from a 1,3-dihalo-2-propanol and a suitable base.

PROCESS CONDITIONS

To obtain a requisite water-soluble product, about 5–45 mole percent of the PEI nitrogen atoms should be amidated with the $C_{12}$–$C_{22}$ fatty acid. A higher substitution yields water-insoluble products while a lower substitution gives products with inadequate softening and sizing properties. Generally it is preferable to amidate the PEI with about 0.1–0.3 mole fatty acid per mole PEI nitrogen.

Amidation to give the intermediate aminopolyamide is achieved in a conventional manner by heating the polyethylenimine and fatty acid at about 120°–210° C. until at least 85 percent of the theoretical water has been evolved. An organic diluent such as toluene or xylene will facilitate the reaction by removing the water azeotropically. Alternately the desired acylation can be achieved with an appropriate acyl halide as described by Reynolds e.a. U.S. Pat. No. 2,772,969.

To cap the residual PEI amino groups, the aminopolyamide is dissolved in water and reacted with epihalohydrin under controlled condition yielding a stable water-soluble polymer in which the amino groups are substituted with a propylenehalohydrin group, e.g. —$CH_2$-CHOH-$CH_2$X where X is Br or Cl. The resulting water-soluble product is stable in the halohydrin form in neutral or mildly acidic aqueous solutions, e.g. at about pH 2.0–7.5. If the solution becomes alkaline, the halohydrin groups are converted into epoxide form with subsequent cross-linking and insolubilization of the polymer.

To obtain a stable water-soluble product, crosslinking must be minimized by reacting the aminopolyamide and epihalohydrin in aqueous solution at about 0°–50° C. Preferably the epihalohydrin is added gradually to a 10–25 percent aqueous solution of the amoinopolyamide over about 0.5–2.0 hours at 20°–40° C. Sufficient epihalohydrin is required to cap at least 80 mole percent of the residual free amino groups. Therefore normally about 0.85–1.20 mole of epichlorohydrin per mole of amino nitrogen is added to the aqueous aminopolyamide solution. A larger excess of epichlorohydrin often requires further treatment to obtain a clear stable product solution.

High conversions are achieved by stirring the reactants at 20°–50° C. for 1–4 hours after complete addition of the epihalohydrin. Then, if necessary, the aqueous product solution is heated at about 50°–100° C. to remove haziness caused by residual epihalohydrin. The resulting clear product solution is then cooled and if necessary the pH adjusted to about 2–7.5, preferably to about 5–7. Such a solution containing 15–30 wt. percent of the polyethylenimine-fatty acid-epihalohydrin product is stable for an extended time at room temperature. However heating to dryness or adding a strong base rapidly transforms the product into a water-insoluble resin.

TREATMENT OF CELLULOSIC PRODUCTS

The cationic PEI-fatty acid-Epi products are readily absorbed from aqueous solution by cellulosic materials. The amount of additive applied depends both upon the specific cellulosic product being treated and the desired properties. But in general additive concentrations ranging from about 0.05–5.0 wt. percent are most useful. Optimum softness of a cotton fabric is generally obtained with a loading of about 0.1–2.0 wt. percent and such treatment facilitates mechanical finishing operations as well as increases the life and utility of the fabrics. However, optimum sizing generally requires a loading of about 0.5–2.5 wt. percent based on dry weight of the cellulosic product. But unlike many commercial sizing agents, these PEI derivatives also contribute a significant degree of wet strength.

Since these additives are effective over a pH range of about 3.0–11.0, they can be used with alkaline paper pulps which cannot be treated with melamine or urea-formaldehyde resins. Also these additives can be used alone with no treatment other than drying required to develop a durable treated product. Yet they can be used if desired in conjunction with conventional fillers and additives including rosin, clay, and calcium carbonate.

When used as a paper additive, these PEI derivatives are preferably added to the pulp slurry at the beater, stock chest, headbox or other point permitting adequate mixing prior to formation of the paper sheet. Alternately performed paper sheets can be sprayed or dipped in an aqueous PEI-fatty acid-EPI solution. Application in this manner is of course preferred for treating textile products.

Finally drying the impregnated or treated product at about 40°–150° C., preferably about 70°–120° C, transforms the water-soluble product into a crosslinked water-insoluble resin which imparts the desired softer hand and/or increased water resistance and wet strength properties to the treated product. The improved color stability has been established both for the aqueous product solution and for the treated cellulosic products.

The following examples illustrate further this invention. Unless otherwise specified, all parts and percentages are by weight.

EXAMPLE 1

PEI-Fatty Acid-Epichlorohydrin Products

The polyethylenimine (PEI) used in the following runs was prepared by an acid catalyzed polymerization of ethylenimine and contained about 20–25 percent tertiary amino groups.

A. A mixture of 680 parts (3.4 mole) lauric acid, 680 parts (15.8 moles) of PEI having an average molecular weight of 1,200 and 600 parts of xylene was heated at 150°–158° C. for 1.5–2.0 hrs. with azeotropic removal of water. When 57 parts (3.2 moles) of water had been removed, the mixture was cooled and the xylene stripped in vacuo leaving about 1,300 parts of a light amber, viscous, water-soluble liquid amino polyamide.

About 100 parts (1.22 mole total N basis) of the aminopolyamide was added to 572 parts of water. To speed dissolution, the mixture was stirred at 70° C. and then the solution containing about 15 percent solids was cooled to 25° C. Then 90.5 parts (0.98 mole) epichlorohydrin was added with stirring in 0.5–1.0 hr. After stirring another hour at 25° C., the aqueous mixture heated for 2 hrs. at 50° C. to complete the reaction and obtain a clear stable solution containing 25 percent total solids. Its pH was about 7.

B. In like manner a series of aminopolyamides have been prepared from polyethylenimine with an average MW ranging from 600–100,000 and a variety of $C_{12}$–$C_{22}$ fatty acid including lauric, oleic, stearic and tall oil acids and then capped by reaction with epichlorohydrin. Typical products are shown in Tables 1 and 2.

TABLE 1

PEI-Fatty Acid-Aminopolyamides

| Run | PEI(MW) | Reactants Fatty Acid | Wt. Ratio FA/PEI | Mole Ratio FA/N | Product |
|---|---|---|---|---|---|
| 1–1 | 1200 | lauric | 1.0 | 0.22 | viscous amber liquid |
| 1–2 | 1200 | oleic | 0.5 | 0.076 | light amber liquid |
| 1–3 | 1200 | lauric | 0.5 | 0.11 | viscous amber liquid |
| 1–4 | 1200 | tall oil* | 2.0 | 0.30 | dark amber liquid |
| 1–5 | 1200 | stearic | 1.0 | 0.15 | waxy solid |
| 1–6 | 600 | stearic | 2.0 | 0.30 | tan waxy solid |
| 1–7 | 1200 | lauric | 2.0 | 0.43 | tan waxy solid |
| 1–8 | 1200 | oleic | 2.0 | 0.30 | very viscous liquid |
| 1–9 | 1200 | stearic | 0.5 | 0.075 | tan waxy solid |
| 1–10 | 100,000* | lauric | 1.28 | 0.28 | tan waxy solid |

*Commercial "Octinol FA-3" from Arizona Chemical Co.,
 Analysis: 98.7% fatty acids, 47% polyunsaturated acids as linoleic acid, 51% oleic acid, 2% saturated fatty acids.

[a]Dried azeotropically prior to reaction with lauric acid.

TABLE 2

PEI-Fatty Acid-Epi Products

| | Aminopolyamide | | Wt. Ratio Epi/PEI-FA | Mole Ratio | | |
|---|---|---|---|---|---|---|
| No. | No. | PEI FA (MW) | | PEI | FA | Epi |
| 2-1 | 1-1 | 1200 lauric | 0.905 | 1.0 | 0.22 | 0.08 |
| 2-2 | 1-1 | 1200 lauric | 0.85 | 1.0 | 0.22 | 0.75 |
| 2-3 | 1-7 | 1200 lauric | 0.41 | 1.0 | 0.43 | 0.53 |
| 2-4 | 1-4 | 1200 tall oil | 0.50 | 1.0 | 0.30 | 0.67 |
| 2-5 | 1-8 | 1200 lauric | 0.50 | 1.0 | 0.30 | 0.67 |
| 2-6 | 1-9 | 1200 stearic | 1.33 | 1.0 | 0.075 | 0.91 |
| 2-7 | 1-6 | 600 stearic | 0.52 | 1.0 | 0.30 | 0.70 |
| 2-8 | 1-8 | 1200 oleic | 0.50 | 1.0 | 0.31 | 0.69 |

Except for the lauric acid derivative of Run 1-7 the aminopolyamides and their Epi reaction products gave stable clear aqueous solutions at a PEI-FA product concentration of about 10–20 wt. percent at 25° C. and a PEI-FA-Epi product concentration of about 15–30 wt. percent at 25° C.

EXAMPLE 2

Use as a Cellulosic Sizing Agent

A. Paper handsheets were made from unbleached Kraft paper pulp or bleached Western Softwood sulfite paper pulp following the general procedure of TAPPI Standard T 205-58 modified by using a drying cycle of 45 sec. at 120° C. and then 1 hr. at 110° C. in a forced draft oven. Each test sheet was aged for 24 hours at 23° C. and 60 percent relative humidity prior to testing.

The sizing of the aged test sheets is measured by clamping a weighed sheet in a holder so that a 2.54 cm diameter ring is firmly held to the upper surface at about the midsection of the test sheet. A Photovolt Reflectance Meter Model 610 (Photovolt Corporation, N.Y.) equipped with a Green Trestimulus Filter and Search Unit 610-Y is mounted with the photocell held directly below the ring. After adjusting the meter to 100 percent reflectance, the ring is filled with Shaeffer's Script No. 2 ink and the sizing efficiency of the additive is determined measured by (a) the time (sec.) required for the reflectance to drop to 50 percent of the initial value, or (b) the percent reflectance after 1,000 sec.

B. Typical sizing results using the PEI–EFA–Epi products of Example 1 and several commercial sizes with paper pulps having an initial pH os 4.5, 6.5, and 8.5 are shown in Table 3. Except for PEI 2-3, the water-insoluble product with a high fatty acid ratio, the PEI adducts are superior sizes at a loading of about 1–2 wt. percent with acid, neutral and alkaline pulps.

TABLE 3

Sizing Values

| Test | Pulp pH | Additive[c] | Sizing Value[a] at Additive Loading[b] of: | | | | |
|---|---|---|---|---|---|---|---|
| | | | 0.5% | 0.75% | 1.0% | 1.5% | 2.0% |
| 3-1 | 4.5 | PEI 2-1 | 50%/7 | 50%/55 | 58%/10³ | 78%/10³ | 81%/10³ |
| 3-2 | | PEI 2-2 | 50%/6 | 52%/10³ | 71%/10³ | 71%/10³ | — |
| 3-3 | | PEI 2-3 | 50%/2 | 50%/2 | 50%/4 | 50%/444 | 71%/10³ |
| 3-4 | | PEI 2-4 | 50%/2 | 50%/2 | 50%/11 | 81%/10³ | — |
| 3-5 | | PEI 2-5 | 50%/2 | 50%/5 | 70%/10³ | 75%/10³ | — |
| 3-6 | | PEI 2-6 | 50%/3 | 50%/6 | 50%/147 | 74%/10³ | 82%/10³ |
| 3-7 | | Rosin-alum | 50%/10 | 50%/35 | 50%/170 | 50%/286 | 50%/262 |
| 3-8 | | cyron size | 50%/5a | 50%/1 | 350%/51 | 70%/10³ | 70%/10³ |
| 3-9 | 6.5 | PEI 2-1 | 50%/2 | 50%/12 | 57%/10³ | 88%/10³ | 94%/10³ |
| 3-10 | | PEI 2-2 | 50%/2 | 50%/6 | 80%/10³ | 94%/10³ | — |
| 3-11 | | PEI 2-3 | 50%/2 | 50%/2 | 50%/2 | 50%/3 | 75%/10³ |
| 3-12 | | PEI 2-4 | 50%/2 | 50%/4 | 50%/117 | 67%/10³ | — |
| 3-13 | | PEI 2-6 | 50%/3 | 50%/20 | 50%/867 | 71%/10³ | 84%/10³ |
| 3-14 | | rosin-alum[d] | X | X | X | X | X |
| 3-15 | 8.5 | PEI 2-1 | 50%/2 | 50%/6 | 50%/199 | 83%/10³ | 90%/10³ |
| 3-16 | | PEI 2-2 | 50%/2 | 50%/3 | 66%/10³ | 80%/10³ | — |
| 3-17 | | PEI 2-3 | 50%/2 | 50%/2 | 50%/2 | 50%/6 | 65%/10³ |
| 3-18 | | PEI 2-4 | 50%/3 | 50%/5 | 50%/7 | 71%/10³ | — |
| 3-19 | | PEI 2-5 | 50%/4 | 50%/6 | 58%/10³ | — | — |
| 3-20 | | PEI 2-6 | 50%/3 | 50%/4 | 50%/200 | 81%/10³ | 90%/10³ |
| 3-21 | | rosin-alum[d] | X | X | X | X | X |
| 3-22 | | cyron size | 50%/2 | 50%/2 | 50%/3 | 50%/3 | 50%/12 |

[a]% Reflectance/sec. after ink application
[b]Wt. % based on dry paper pulp
[c]PEI-FA-Epi derivatives from Table 2 Rosin-alum: Conventional rosin-aluminum sulfate size Cyron Size: A stearic acid polyamide from American Cyanamid
[d]The rosin-alum size requires an acidic pulp with pH below 5.5

C. As a comparison with the polyamine derivatives of the prior art, a solution of 170.1 parts (0.90 mole) of tetraethylenepentamine (TEPA) in 180.6 parts water was condensed with 83.3 parts (0.90 mole) epichlorohydrin as described in Dudley U.S. Pat. No. 2,479,480. A portion of the resulting TEPA-Epi condensation product was condensed with 0.1 mole lauric acid per mole N using xylene to azeotrope the water as described by Dudley. A second portion was similarly acylated with stearic acid. These products were then evaluated as sizing agents as described above. The results along with comparative data for the present PEI–FA–Epi products having a similar lauric or stearic acid content age given in Table 4.

TABLE 4

Comparative Sizing Tests

| Test | Pulp pH | Additive | Sizing Values: Loading of | | | |
|---|---|---|---|---|---|---|
| | | | 0.5% | 1% | 1.5% | 2.0% |
| 4-1 | 4.5 | TEPA-epi | 50%/12 | 50%/3 | 50%/2 | 50%/3 |
| 4-2 | 4.5 | TEPA-Epi-Stearic[e] | 50%/100 | 74%/10² | 76/10³ | 73%/10³ |
| 3-1 | 4.5 | PEI-lauric-epi | 50%/7 | 58%/10³ | 78%/10³ | 81%/10³ |
| 3-6 | 4.5 | PEI-stearic epi | 50%/3 | 50%/147 | 74%/10³ | 82%/10³ |
| 4-3 | 7.5 | TEPA-epi-lauric[e] | 50%/5 | 50%/21 | 50%/28 | 50%/16 |
| 4-4 | 7.5 | TEPA-epi-stearic[e] | 50%/120 | 77%/10³ | 80%/10³ | 88%/10³ |
| 3-15 | 8.5 | PEI-lauric epi | 50%/2 | 50%/199 | 83%/10³ | 90%/10³ |
| 3-20 | 8.5 | PEI-stearic epi | 50%/3 | 50%/200 | 81%/10³ | 90%/10³ |

[e]Dudley U.S. 2,479,480

EXAMPLE 3

Use as a Wet Strength Additive

Not only are the PEI–FA–Epi products of Example 1 effective sizes, but in addition to imparting a high degree of water resistance they also increase the wet strength of the treated paper and textile products. Typical results are given in Table 4.

An unbleached sulfite spruce pulp with a Canadian Standard Freeness of 500 mls was used following the general procedure of TAPPI method T-403. Handsheets were prepared by TAPPI Method T-205 modified in the drying cycle by curing in a steam-heated press at 120° C. for 45 sec. and then in an oven at 105° C. for 1 hour. The test sheets were conditioned at 23° C. and 50 percent relative humidity prior to testing. After weighing, the handsheets were soaked in water for 4 hrs., blotted to remove excess water and tested on a Muellens Burst Tester.

TABLE 5

Wet Strength Values

Wet Burst Strength (psi):
Loading of

| Test | Additive | 0.25% | 0.50% | 0.75% | 1.0% | 1.5% 2.0% |
|---|---|---|---|---|---|---|
| 5-0 | None | -3.0- | — | — | — | — |
| 5-1 | PEI 2-1 | 7.1 | 14.4 | 19.6 | 24.6 | 28.5 29.7 |
| 5-2 | PEI 2-6 | 2.5 | 3.4 | 7.8 | 8.0 — | 20.7 |

Although the sizing and wet strength functions are distinctly different, note that these PEI-FA-Epi products not only are effective sizing agents when used at a loading of about 1.0 wt. percent or more as shown in Example 2, but also give a significant increase in wet strength at loadings as low as 0.25 percent.

EXAMPLE 4

Use as a Softening Agent

For use as a softening agent for paper or textiles, a PEI-FA-Epi product containing about 0.2-0.35 moles FA/PEI nitrogen is preferred.

A. To demonstrate the utility of the PEI-Lauric Acid-Epi Product 2-1 as a softener, lightweight paper handsheets were prepared from an unbleached sulfite pulp having a freeness of 550±50 ml C.S.F. and a pH of 7.0 diluted to a 0.11 percent pulp suspension by the general procedure described in Example 3. The test sheets were conditioned overnight under standard TAPPI conditions and then measured for stiffness/limpness, dry tensile strength, and water absorbency.

In determining the stiffness 15 mm strips of the tests sheets are cut to a length of 7.5 inch (19.0 cm) weighed and clamped horizontally so that 3.0 inch (7.62 cm) protrudes beyond the clamp. The horizontal deflection of the end of the strip is measured, the strip is turned over and the deflection again measured. Using the average value for 6 test strips, the compound modulus of tensile and compression (E) is calculated by the formula:

$$E \text{ (g./cm.}^2\text{)} = \frac{3Wl^3}{2b z^3 \Delta}$$

where
W = wt. of strip in grams
$l$ = length of strip in cm
b = width of strip in cm
z = av. thickness of strip in cm
Δ = av. deflection in cm The dry tensile strength and breaking length of the test strips were than measured using a test span of 90 mm and a stretching speed of 1.27 cm/min.

The water absorbency was determined by TAPPI Method T-432 using a 0.1 ml water drop and measuring the time required for it to be absorbed into the paper.

TABLE 6

Paper Softening Agents

| Test | Additive[a] | Thickness Z, mm | wt. g | Deflection Δ, cm | Modulus E, g/cm² ×10⁻⁷ | H₂O absorb. time, sec. | Dry breaking length m[b] |
|---|---|---|---|---|---|---|---|
| 6-0 | None | 0.113 | 0.156 | 1.28 | 1.487 | 302 | 5440 |
| 6-1 | 0.05% PEI 2-1 | 0.108 | 0.152 | 1.858 | 1.142 | 325 | 5020 |
|  | 0.10% PEI 2-1 | 0.108 | 0.149 | 1.925 | 1.077 | 322 | 5090 |
|  | 0.20% PEI 2-1 | 0.108 | 0.149 | 1.558 | 1.327 | 357 | 5330 |
|  | 0.50% PEI 2-1 | 0.108 | 0.145 | 1.658 | 1.248 | >1000 | 5080 |
| 6-2 | 0.05% QN | 0.109 | 0.152 | 0.152 | 1.359 | 222 | 4940 |
|  | 0.20% QN | 0.108 | 0.149 | 1.592 | 1.333 | 386 | 4180 |
|  | 0.50% QN | 0.126 | 0.182 | 1.283 | 1.256 | 351 | 4090 |

[a] PEI 2-1: PEI-lauric acid-Epi QN: Dihydrogenated and allow dimethyl ammonium chloride (Arquad 2HT) from Armour Industrial Chemicals
[b] Determined after curing at 110°C for 0.5 hr.

B. A cotton broadcloth (3.8 oz/yd²) was impregnated by padding with an aqueous solution of PEI 2-8 and then tumble dried in an electric dryer for 30 min. at 80°-85 C. The add-on weight was 0.54 percent on a solids basis. The treated broadcloth after conditioned for 18 hrs at 20° C. and 65 percent relative humidity was rated by a test panel considerably softer than a control untreated sample. Another treated cloth with an add on of 1.56 percent was rated slightly softer than the untreated cloth.

EXAMPLE 5

Color Stability

The use of polyethylenimine and its derivatives in many areas including paper wet strength, and dimensional stabilization of textiles has been hindered by the tendency of these polymers to yellow upon aging or heating in the presence of air as in many drying operations. A modification of TAPPI methods T452 and T217 was developed using standard white broadcloth substrate. The test polymer was applied from aqueous solution with a laboratory padder and then the samples were given a minimal drying by heating at 80° C. for 2 minute. Test samples cut from the treated cloth were then heated for 30 min. at 120° C. or 150° C. in a forced air oven, cooled, and measured for reflectance using a Photovolt Search Unit 610-W with a blue Kodak Wratten Filter No. 49.

Typical results shown in Table 7 demonstrate the greater color stability of the PEI-FA-Epi products even when an unsaturated fatty acid such as Tall Oil is used.

TABLE 7

Accelerated Color Stability Test

| Test | PEI Additive | % Reflectance pick-up | 80°C/ 2 min. | 120°C/ 80 min. | 150°C/ 80 min. |
|---|---|---|---|---|---|

| | | | | | |
|---|---|---|---|---|---|
| 7 A-1 | PEI (1200 MW) | 0.64% | 87.8 | 80.8 | 69.4 |
| 7 A-2 | PEI (1800 MW) | 0.68% | 88.4 | 81.0 | 68.3 |
| 7 A-3 | PEI (100,000 MW) | 0.68% | 83.5 | 70.8 | 57.1 |
| 7 B-1 | PEI 1-1 (PEI+Lauric Acid) | 0.61 | 86.0 | 72.8 | 59.5 |
| 7 B-2 | PEI 1-6 (PEI+Stearic Acid) | 0.65 | 88.1 | 76.3 | 65.1 |
| 7 B-3 | PEI 1-4 (PEI+Tall Acid) | 0.60% | 82.4 | 62.5 | 55.1 |
| 7 C-1 | PEI 2-1 (PEI+Lauric+Epi) | 0.67% | 88.9 | 85.5 | 78.0 |
| 7 C-2 | PEI 2-7 (PEI+Stearic+Epi) | 0.67% | 89.0 | 84.5 | 72.3 |
| 7 C-3 | PEI 2-4 (PEI+Tall+Epi) | 0.69% | 87.9 | 85.1 | 70.8 |

A similar increase in color stability is observed when the PEI-FA-Epi products are used as additives for paper, for sizing glass fibers and for improving the strength of cellophane films.

I claim:

1. A cellulosic product containing about 0.05–5.0 weight percent of a polyethylenimine-fatty acid-epichlorohydrin product prepared by:
   A. Condensing a water-soluble polyethylenimine having a molecular weight of at least about 500 with about 0.05–0.45 mole of a $C_{12}$–$C_{22}$ fatty acid per polyethylenimine nitrogen to yield a water-soluble aminopolyamide; and thereafter,
   B. Capping the free amino groups of the aminopolyamide by reaction in aqueous solution at about 0°–50° C. with at least 0.8 mole of epichlorohydrin per amino group to yield a water-soluble, thermosetting polyethylenimine-fatty acid-epichlorohydrin resin soluble in water as a 15–30 weight percent solution at pH 2.0–7.5 and 25° C.

2. The cellulosic product of claim 1 where the water-soluble polyethylenimine has an average molecular weight of about 500–5,000.

3. The cellulosic product of claim 1 where the fatty acid is lauric acid.

4. The cellulosic product of claim 1 where the fatty acid is stearic acid.

5. The cellulosic product of claim 1 where the fatty acid is oleic acid.

6. The cellulosic product of claim 1 where the fatty acid is tall oil.

7. The cellulosic product of claim 2 containing about 0.5–2.5 weight percent of the polyethylenimine-fatty acid-epichlorohydrin condensation product as a sizing agent.

8. The cellulosic product of claim 2 containing about 0.1–2.0 weight percent of the polyethylenimine-fatty acid-epichlorohydrin condensation product as a softening agent.

* * * * *